(12) United States Patent
Elend

(10) Patent No.: US 11,463,198 B2
(45) Date of Patent: Oct. 4, 2022

(54) SECURITY MODULE FOR A SERIAL COMMUNICATIONS DEVICE

(71) Applicant: NXP B.V., Eindhoven (NL)

(72) Inventor: Bernd Uwe Gerhard Elend, Hamburg (DE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/984,699

(22) Filed: Aug. 4, 2020

(65) Prior Publication Data

US 2021/0044382 A1 Feb. 11, 2021

(30) Foreign Application Priority Data

Aug. 6, 2019 (EP) ..................... 19190344

(51) Int. Cl.
 *G01R 31/28* (2006.01)
 *H04L 1/00* (2006.01)
 *G06F 21/74* (2013.01)

(52) U.S. Cl.
 CPC ............ *H04L 1/0061* (2013.01); *G06F 21/74* (2013.01); *H04L 1/0072* (2013.01)

(58) Field of Classification Search
 CPC ...... H04L 1/0061; H04L 1/0072; G06F 21/74
 See application file for complete search history.

(56) References Cited

U.S. PATENT DOCUMENTS

| | | | |
|---|---|---|---|
| 9,380,070 B1 * | 6/2016 | Cain | H04L 63/08 |
| 10,361,934 B2 * | 7/2019 | Elend | H04L 43/08 |
| 2014/0149801 A1 * | 5/2014 | Jiang | H04L 12/40 714/43 |
| 2015/0135271 A1 * | 5/2015 | Forest | H04L 9/3226 726/4 |
| 2015/0347218 A1 * | 12/2015 | Domingues | G06F 11/0772 714/57 |
| 2017/0093659 A1 | 3/2017 | Elend et al. | |

(Continued)

FOREIGN PATENT DOCUMENTS

| | | |
|---|---|---|
| EP | 2 985 955 A1 | 2/2016 |
| EP | 3 148 154 A1 | 3/2017 |

OTHER PUBLICATIONS

Dagan, T. et al. "Parrot, a software-only anti-spoofing defense system of the CAN bus", retreived from the internet at: url:https://www.eng.tau.ac.il/yash/Parrot-escar2016.pdf, 10 pgs. (Nov. 17, 2016).

(Continued)

*Primary Examiner* — Samir W Rizk

(57) ABSTRACT

A security module (434) for a serial communications device. The security module (434) comprising: a receive data, RXD, input interface (436) for receiving data from a serial communications bus (404); and a transmit data, TXD, output interface (438) for transmitting data to the serial communications bus (404). The security module (434) is configured to: receive a message (540) from the serial communications bus (404) via the RXD input interface (436); compare the message (540) with one or more error conditions; and upon detection that an error condition has been violated, output an error-signal (543) to the serial communications bus (404) via the TXD output interface (438), wherein the error-signal (543) identifies one or more parameters relating to the error condition.

20 Claims, 7 Drawing Sheets

(56) References Cited

U.S. PATENT DOCUMENTS

2018/0152472 A1    5/2018  Amano et al.
2021/0044600 A1    2/2021  Elend
2021/0044615 A1    2/2021  Elend

OTHER PUBLICATIONS

"CAN with Flexible Data-Rate—Specification Version 1.0", Robert Bosch, retrieved from url:https://web.archive.org/web/20151211125031if_/http://www.bosch-semiconductors.de/media/ubk_semiconductors/pdf_1/canliterature/can_fd_spec.pdf, 34 pgs. (Apr. 17, 2012).

Matsumoto, T. et al. "A Method of Preventing Unauthorized Data Transmission in Controller Area Network", IEEE 75th Vehicular Technology Conference, 5 pgs., (2012).

* cited by examiner

SECURITY MODULE FOR A SERIAL COMMUNICATIONS DEVICE

CROSS-REFERENCE TO RELATED APPLICATIONS

This application claims the priority under 35 U.S.C. § 119 of European patent application no. 19190344.2, filed on Aug. 6, 2019, the contents of which are incorporated by reference herein.

FIELD

The present disclosure relates to a security module for a serial communications device, such as in controller area networks.

BACKGROUND

One example of a serial communications network is a controller area network (CAN), which is a message-based communications bus protocol that is often used within automobiles. The CAN bus protocol is used to enable communications between various electronic control units (ECUs), such as an engine control module (ECM), a power train control module (PCM), airbags, antilock brakes, cruise control, electric power steering, audio systems, windows, doors, mirror adjustment, battery and recharging systems for hybrid/electric cars, and many more. The data link layer of the CAN protocol is standardized as international Standards Organization (ISO) 11898-1. The standardized CAN data link layer protocol has also been extended to provide higher data rates. The extended protocol, referred to as CAN Flexible Data-Rate or "CAN FD," is part of the ISO 11898-1:2015 version of the standard. A next generation CAN protocol termed CAN XL is also under development.

Other types of serial communications networks are known, and include for example—Local Interconnect Network (LIN).

SUMMARY

According to a first aspect of the present disclosure there is provided a security module for a serial communications device, the security module comprising:
  a receive data, RXD, input interface for receiving data from a serial communications bus;
  a transmit data, TXD, output interface for transmitting data to the serial communications bus;
  wherein the security module is configured to:
    receive a message from the serial communications bus via the RXD input interface;
    compare the message with one or more conditions; and
    upon detection that a condition has been violated, output an error-signal to the serial communications bus via the TXD output interface, wherein the error-signal identifies one or more parameters relating to the condition.

Providing such an error-signal can enable more detailed information about the condition to be communicated to nodes on the bus, such that remedial action can be taken that is appropriate for the specific condition that has been violated.

In one or more embodiments, the one or more parameters relating to the condition can take one of at least three different values.

In one or more embodiments, the error-signal comprises an error-identifier of one or more conditions that have been violated.

In one or more embodiments, the security module is associated with a serial communications node. The error-signal may comprise a node-identifier of the serial communications node.

In one or more embodiments, the error-signal comprises a security-module-identifier of the security module.

In one or more embodiments, the security module is configured to:
  compare (i) the error-signal that is output to the serial communications bus via the TXD output interface; with (ii) a bus-error-signal that is received via the RXD input interface; and
  output an error-check-signal to the serial communications bus via the TXD output interface, wherein the error-check-signal is indicative of whether or not there is a difference between the error-signal and the bus-error-signal.

In one or more embodiments, the security module is configured to:
  compare (i) the value of a particular bit position of the error-signal that is output to the serial communications bus via the TXD output interface; with (ii) the value of the same bit position of a bus-error-signal that is received via the RXD input interface; and
  output an error-check-signal to the serial communications bus via the TXD output interface, wherein the error-check-signal is indicative of whether or not there is a difference between the values of the error-signal and the bus-error-signal at the particular bit position.

In one or more embodiments, the error-check-signal comprises one or more dominant bits if there is a difference between the error-signal and the bus-error-signal.

The error-signal may comprise: a first-identifier relating to the condition; and a second-identifier relating to the condition. The bus-error-signal may comprise: a bus-first-identifier relating to the condition; and a bus-second-identifier relating to the condition. The error-check-signal may comprise: a first-error-check-signal, which is indicative of whether or not there is a difference between: (i) the first-identifier of the error-signal; and (ii) the bus-first-identifier of the bus-error-signal; and/or a second-error-check-signal, which is indicative of whether or not there is a difference between: (i) the second-identifier of the error-signal; and (ii) the bus-second-identifier of the bus-error-signal.

The security module may be associated with a serial communications node. The first-identifier may comprise a node-identifier of the serial communications node. The bus-first-identifier may comprise a bus-node-identifier of one or more serial communications nodes. The second-identifier may comprise an error-identifier of one or more conditions that have been violated. The bus-second-identifier may comprise a bus-error-identifier of one or more conditions that have been violated.

In one or more embodiments, the error-signal comprises a plurality of bit positions. Each of the bit positions may uniquely identify a particular condition or a particular node-identifier.

In one or more embodiments, the security module is associated with a serial communications node. The error-signal may comprise a node-identifier of the serial communications node. The node-identifier may comprise a plurality of bit positions. Each of the bit positions of the node-identifier may uniquely identify a particular node. The error-signal may comprise an error-identifier of one or more s that have been violated. The error-identifier may comprise a plurality of bit positions. Each of the bit positions of the error-identifier may uniquely identify a particular condition.

In one or more embodiments, the error-signal comprises a plurality of bit positions. The error-signal may comprise a dominant bit value at a predetermined bit position.

In one or more embodiments, the predetermined bit position is the first bit position.

In one or more embodiments, the serial communications device in a CAN XL node. The serial communications bus may be a CAN XL bus.

According to a further aspect of the invention, there is provided a method of outputting an error-signal to a serial communications bus, the method comprising:
 receiving a message from the serial communications bus;
 comparing the message with one or more conditions; and
 upon detection that a condition has been violated, outputting an error-signal to the serial communications bus, wherein the error-signal identifies one or more parameters relating to the condition.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments failing within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

BRIEF DESCRIPTION OF THE DRAWINGS

One or more embodiments will now be described by way of example only with reference to the accompanying drawings in which:

FIG. 8 illustrates a fourth example of data that can be put onto a serial communications bus according to an embodiment of the disclosure;

DETAILED DESCRIPTION

Figure 1:
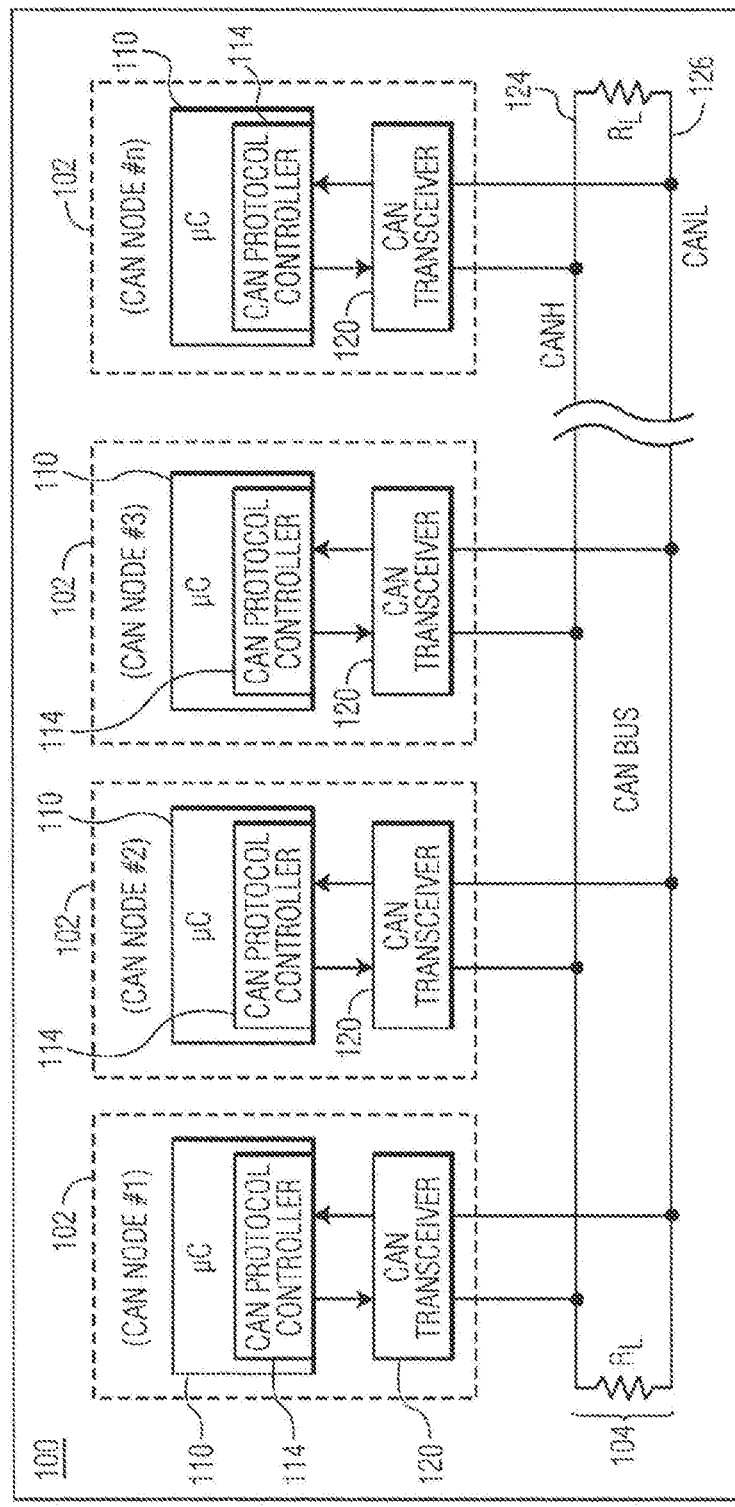
FIG. 1 shows a CAN network.

FIG. 1 depicts a CAN network 100 that includes multiple CAN nodes 102, also referred to as ECUs, each connected to a CAN bus 104. In the embodiment of FIG. 1, each CAN node 102 includes a CAN transceiver 120, a local controller 110, or microcontroller, having an embedded CAN protocol controller 114. The local controllers 110 are typically connected to at least one device (not shown) such as a sensor, an actuator, or some other control device and are programmed to determine the meaning of received messages and to generate appropriate outgoing messages. The local controllers may also be referred to as host processors, hosts, or digital signal processors (DSPs). In some examples, the host supports application software that interacts with the CAN protocol controller 114.

The CAN protocol controllers 114, which can be embedded within the local controllers 110 or external to the local controllers (e.g., a separate IC device), implement data link layer operations. For example, in receive operations, a CAN protocol controller 114 stores received serial bits from the transceiver 120 until an entire message is available for fetching by the focal controller 110. The CAN protocol controller 114 can also decode CAN messages according to the standardized frame formats of the CAN protocol in transmit operations, the CAN protocol controller 114 receives messages from the local controller and transmits the messages as serial bits in one of the CAN frame formats to the CAN transceiver 120.

The CAN transceivers 120 are located between the CAN protocol controllers 114 and the CAN bus 104 and implement physical layer operations. For example, in receive operations, a CAN transceiver 120 converts analog differential signals from the CAN bus to serial digital signals that the CAN protocol controller 114 can interpret. The CAN transceiver also protects the CAN protocol controller 114 from extreme electrical conditions on the CAN bus 104, e.g., electrical surges. In transmit operations, the CAN transceiver 120 converts serial digital bits received from the CAN protocol controller 114 into analog differential signals that are sent on the CAN bus 104.

The CAN bus 104 carries analog differential signals and includes a CAN high (CANH) bus line 124 and a CAN low (CANL) bus line 126.

Figure 2:
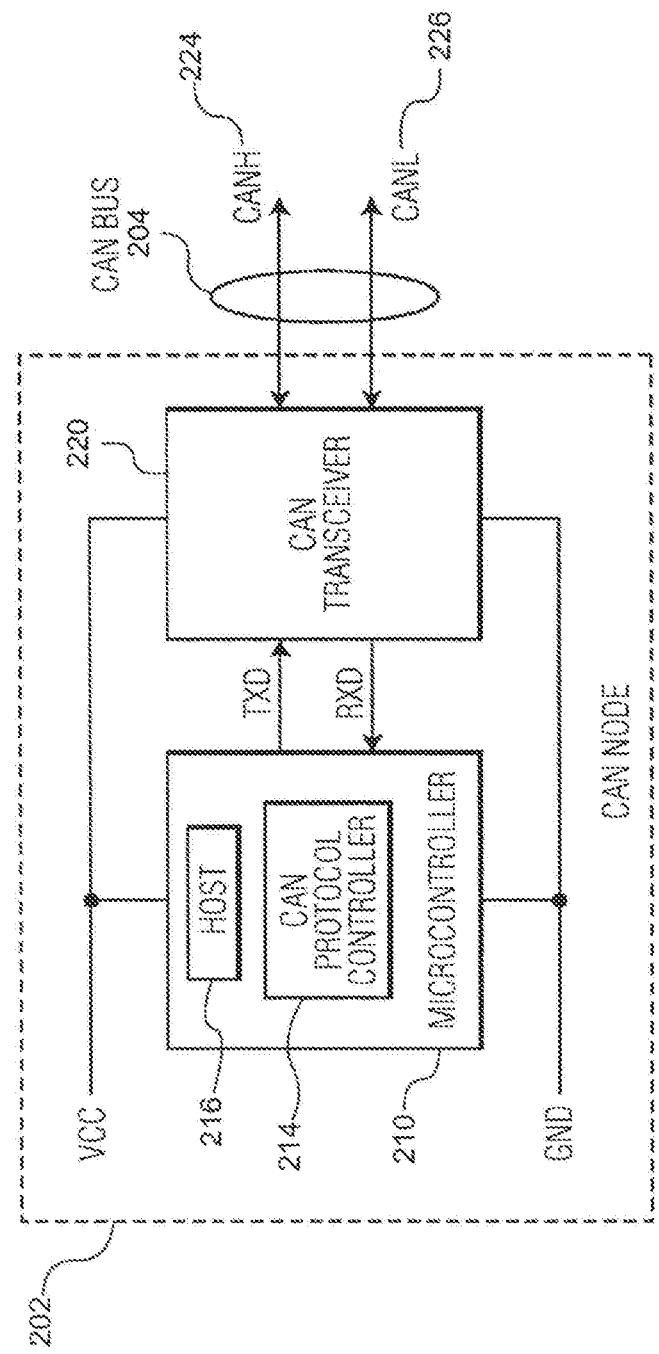
FIG. 2 shows an expanded view of a CAN node.

FIG. 2 depicts an expanded view of one CAN node 202. Features of FIG. 2 that are also shown in FIG. 1 have been given corresponding reference numbers in the 200 series and will not necessarily be described again here.

The local controller 210 includes a host 216, which may be, for example, a software application that is stored in memory of the local controller 210 and executed by processing circuits of the local controller 210. The local controller 210 and the CAN transceiver 220 of the CAN node 202 are connected between a supply voltage, Vcc, and ground, GND. In some examples, the local controller 210 and the CAN transceiver 220 may have different supply voltages. As illustrated in FIG. 2, data communicated from the local controller 210 to the CAN transceiver 220 is identified as transmit data (TXD) and data communicated from the CAN transceiver 220 to the local controller 210 is referred to as receive data (RXD). Data is communicated to and from the CAN bus via the CANH and CANL bus lines 224 and 226, respectively.

Figure 3:
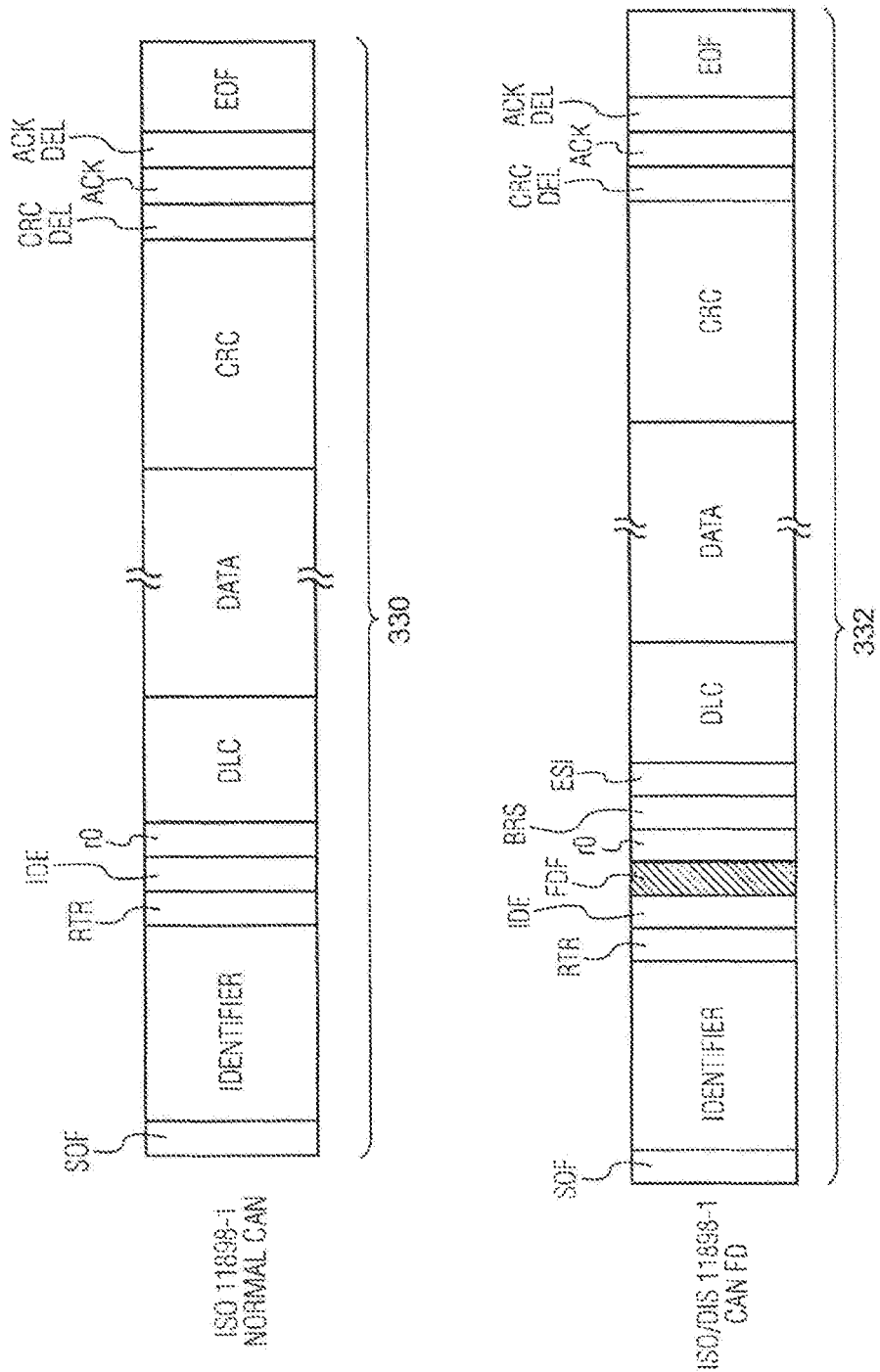
FIG. 3 shows a Classical CAN frame and a CAN-FD frame in base frame format.

FIG. 3 depicts the format of an ISO 11898-1 frame 330 (in the classical base frame format (CBFF) or standard format) that is used in CAN normal mode and also the format of an ISO/DIS 11898-1 frame 332 (in the FD base frame format or FBFF) that is used in CAN FD mode. The fields of the CAN normal mode and CAN FD mode frames are defined as follows:

SOF: Start of Frame (always dominant)
IDENTIFIER: Identifier Bits, defining the message content
RTR: Remote transmission Request
IDE: ID Extension
r0: Reserved Bit 0 (replaced by FDF in the CAN FD format)
FDF: FD Format (this is the bit distinguishing the frame formats)
BRS: Baud Rate Switch
ESI: Error State Indicator
DLC: Data Length Code
Data: Data Bytes
CRC: Cyclic Redundancy Check
CRC Del: CRC Delimiter (always recessive)
ACK: Acknowledge
ACK Del: Acknowledge Delimiter
EOF: End Of Frame There is also another version of the classical frame format, referred to as "classical extended frame format (CEFF)," in which the FDF bit is in the old r1 position, whereas the FDF bit is in the r0 position in CBFF. There is also a "FD extended frame format (FEFF)," where "extended" refers to a 29-bit identifier. Of note, the CAN protocols use the reserved bit (r0 or r1) (also referred to generally as the FDF bit) within a CAN frame to identify a frame as a CAN FD mode frame. In particular, the FDF bit is a 1-bit field that indicates whether the frame is a CAN normal mode frame or a CAN FD mode frame. When the FDF bit is dominant (e.g., low or "0"), the frame is a CAN normal mode frame and when the FDF bit is recessive (e.g., high or "1"), the frame is a CAN FD mode frame. In a CAN normal mode frame, the reserved bits (r0, r1) are always driven dominant to the bus lines.

CAN messages are broadcast messages and the identifier is unique to the sender CAN node. The CAN protocol controllers of the receiving CAN nodes have identifier filters that are "tuned" to certain identifiers to make sure that the host receives relevant messages and is not bothered with irrelevant messages. Standard CAN frames have an 11-bit IDENTIFIER field to carry an 11-bit identifier and extended CAN frames have a 29-bit IDENTIFIER field to carry a 29-bit identifier. The 29-bit IDENTIFIER field is divided into two sections, an 11-bit base IDENTIFIER field and an 18-bit extended IDENTIFIER field.

In Classical CAN and CAN FD all receivers of a message will discard the message if there is at least one dominant bit in the end-of-frame field. This allows receivers that have seen errors during decoding to signal their inability to decode and force the transmitter to repeat the message. Furthermore, this mechanism is used by transceivers for which their messages have been spoofed, and other cyber security mechanisms, to invalidate messages that violate a user defined policy.

In some newer protocol developments, like CAN XL, it is yet not foreseen that messages can be invalidated and thus there won't be any automatic repetition. If repetition is needed, then this may need to be handled on higher protocol layers as it may not be possible on the protocol layer.

Figure 4A:
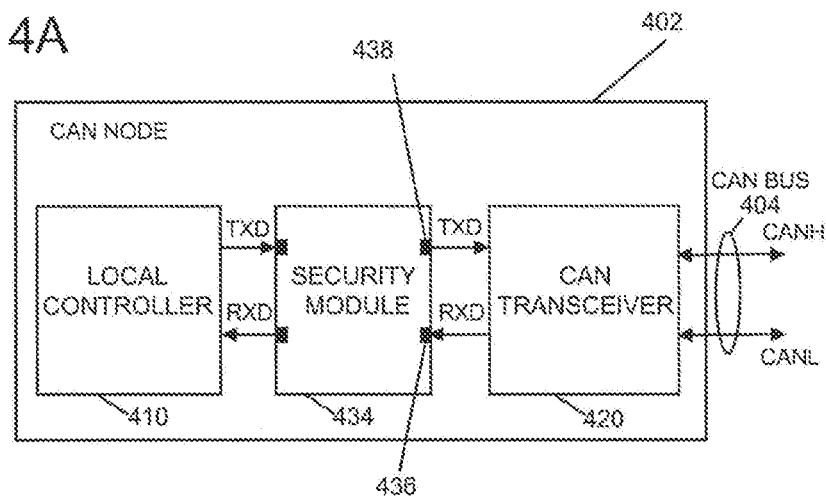
FIG. 4A shows a CAN node including a security module according to an embodiment of the disclosure.

FIG. 4A depicts a CAN node 402 including a security module 434 according to an embodiment of the present disclosure. In this embodiment, the security module 460 is provided separately to a CAN transceiver 420 and a CAN local controller 410. The security module 460 is located in a data path between the CAN transceiver 420 and the CAN local controller 410.

Figure 4B:
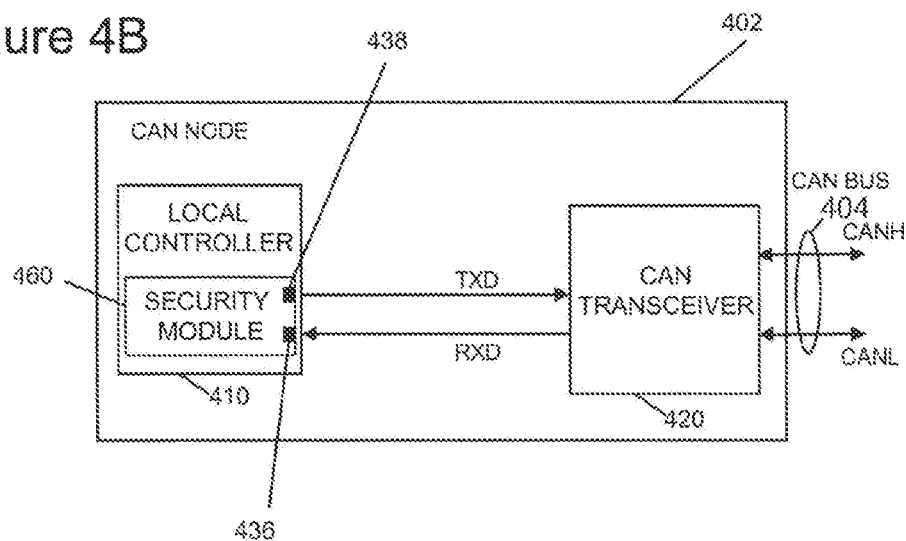
FIG. 4B shows a CAN node including another security module according to an embodiment of the disclosure.

FIG. 4B depicts a CAN node 402 including a security module 460 according to another embodiment of the present disclosure. In this embodiment, the security module 460 is provided as part of the CAN local controller 410. For instance, the functionality of the security module 460 can be provided by a CAN protocol controller.

In a further still embodiment, the functionality of the security module 460 can be provided by the CAN transceiver 420. This can improve the security of the network even further.

The CAN node 402 includes a CAN transceiver 420 and a local CAN controller 410 as described above with reference to FIGS. 1 and 2. The CAN transceiver 420 is connected to a CAN bus 404.

The CAN bus 404 is an example of a serial communications bus, the CAN node 402 is an example of a serial communications device/node, and the CAN transceiver 420 is an example of a serial communications transceiver. It will be appreciated that examples disclosed herein can relate to a Classical CAN node, a CAN FD node, a CAN XL node, or any other CAN node that satisfies an associated CAN standard, either now or in the future. It will also be appreciated embodiments of the security module that are described herein are not limited to CAN protocols, as they can be used with other serial communications protocols/networks such as LIN.

In this example, the security module 434 is shown separately from the CAN transceiver 420 and the local controller 410. It will be appreciated that in other examples the functionality of the security module 434 can be provided by the CAN transceiver 420 and/or the local controller 410.

The security module 434 includes a receive data, RXD, input interface 436 for receiving data from the CAN bus 404. The security module 434 also includes a transmit data, TXD, output interface 438 for transmitting data to the CAN bus 404. The security module 434 can receive a message from the CAN bus 404 via the RXD input interface 436, and compare the message with one or more conditions. The conditions can include one or more of form errors, stuff errors and policy violations, as non-limiting examples. For instance a policy may be violated if the security module determines that the CAN message is being spoofed. Various types of form errors and stuff errors are known in the art.

If the security module 434 detects that a condition has been violated, then it can output an error-signal to the CAN bus 404 via the TXD output interface 438. In this way, the security module 434 can perform one or more of: identifying form errors and/or stuff errors; and determining that a policy has been violated.

The error-signal identifies one or more parameters relating to the condition. That is, the error-signal comprises information about the error signal, such that it is more than a mere binary flag that indicates only whether or not a condition has been violated. The inclusion of such error information in a serial communications protocol, such as CAN, goes against the teachings in the art. This is because known serial communications protocols do not allow the inclusion of such information on the serial communications bus. Therefore, any attempt to go against these teachings of the prior art would result in the rules of the protocol not being satisfied.

By way of example, in the current CAN and CAN FD protocols such information would be invalidated by other nodes that immediately react with an error flag after receiving the first dominant bit of information in the EOF field. Simple signalling of acknowledge and also "negative acknowledge" (n-ack) are known also in other serial communication protocols. Sending information about the reason for a negative acknowledge triggered from a lower OSI layer, not involving higher (software) layers has advantages from a security perspective, as the lower (hardware) layer cannot be hacked. Also, the ability of the legitimate sender node to signal instantaneously whether the information (associated with the negative acknowledge) it has received has been modified/spoofed due to it violating a policy is also advantageous.

One or more of the examples described herein can be beneficial over solutions that require the interaction of the lower and higher layers of the protocol; where the lower layer reports the reason for the n-ack to a higher layer, which then in turn can trigger a next message that conveys the information. This would require more bandwidth and add to the reaction time after an incident has happened.

The error-signal of the present disclosure can include an error-identifier of one or more conditions that have been violated. In this way, an example of a parameter is a reason that an error-signal has been generated. Alternatively or additionally, the error-signal can include a security-module-identifier of the security module that has detected that one or more conditions have been violated. In some examples, the identifier may be a node-identifier of the CAN node 420 with which the security module 434 is associated. In this way, another example of a parameter is the originator of the error-signal. In some examples, any of these parameters can take one of at least three different values—that is, they are more than mere binary flags. As will be discussed in detail below, this can be embodied by using digital error-signals that include a plurality of bit positions.

In some examples, as will be described below, the security module 434 can output an error-check-signal on to the CAN bus 404, which may be a bit field at the end of the frame such as after the error-signal. The error-check-signal can indicate the authenticity of a bus-error-signal on the CAN bus 404. As will be described in detail below, the bus-error-signal is a combination of all of the error-signals that have been put onto the CAN bus 404 by individual CAN nodes. Since it is possible that an error-signal from one node can overwrite some or all of an error-signal from another node, the error-check-signal can advantageously provide an indicator as to whether or not any such over-writing (or other manipulation) of an original error-signal has occurred.

The following examples relate to a serial communication protocol where a security module associated with a node can receive data from a serial communications bus at a RXD input interface, and can transmit data to the serial communications bus via a TXD output interface. Messages on the serial communications bus have an end-of-frame field. In the EOF field the bit timing can be the bit timing of an arbitration phase. The behaviour of the physical layer is as in the arbitration phase; so dominant bits ("0") overwrite recessive bits ("1"). This information can be sent by multiple nodes. The information and its usage can be defined by the user. What is important is that the message can be discarded on the data link layer and the information can be handed to higher protocol layers.

FIRST EXAMPLE—FIG. 5

Figure 5:
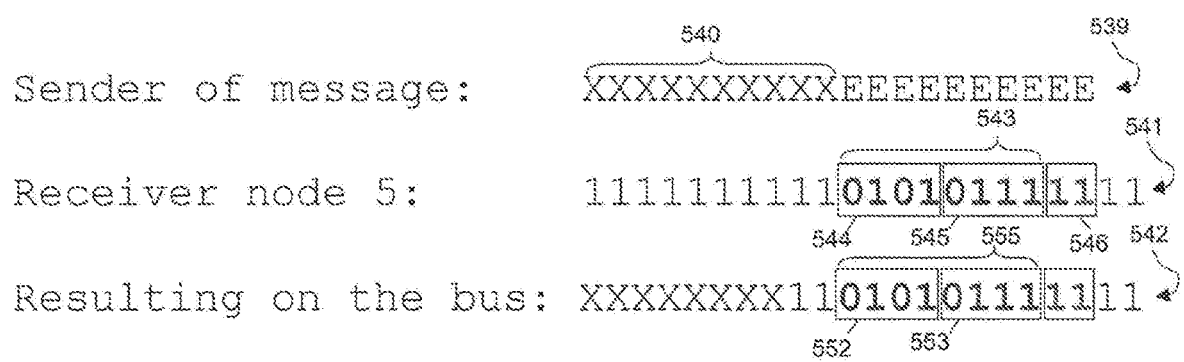
FIG. 5 illustrates a first example of data that can be put onto a serial communications bus according to an embodiment of the disclosure.

FIG. 5 sews data 539 that a node sends on to a serial communications bus. The data 539 includes a message 540 that comprises message bits "x", and an EOF (end of frame field) with recessive bits "e". In this example, the recessive bits are 1s.

FIG. 5 also shows data 541 that is put on to the serial communications bus by node 5, which is a different node to the one that sent the message 540. Node 5 has a security module that has compared the received message 540 with one or more conditions, in this example security policies, and detected that a security policy has been violated. In this example, node 5 has determined that security policy number 7 has been violated. That is, the received message 540 does not satisfy policy number 7. Policy number 7 may be specific to node 5, or may be a generic policy that applies to multiple nodes, possibly all of the nodes. Node 5 therefore outputs an error-signal 543 to the serial communications bus.

The error-signal 543 comprises a node-identifier 544 that is associated with the serial communications node that detected the condition. In this example, the node-identifier 544 is a binary representation of 5; that is the identification number of node 5. In this way, the identifier of the node (or security module) that detected the violation of the error signal is an example of a parameter relating to the error.

The error-signal 543 also comprises an error-identifier 545 that is associated with the condition that has been violated. In this example, condition number 7 has been violated and the error-identifier 545 is a binary representation of 7. In this way, the identifier of the condition that has been violated is an example of a parameter relating to the condition.

Node 5 also provides an optional error-check-signal 546 to the bus, which will be discussed in more detail with reference to later examples. After the error-check-signal 546, node 5 puts recessive bits 1s on the bus to indicate that it is ready to receive or send a new message.

FIG. 5 shows the resultant data 542 on the serial communications bus, which includes a bus error-signal 555. The bus error-signal 555 includes a bus-node-identifier 552 and a bus-error-identifier 553. In this example it is a combination of the message 540, the error-signal 543 and the error-check-signal 546.

By accessing the data 542 on the serial communications bus, all nodes can determine that:
a) the message must be discarded, because there are dominant bits in the EOF;
b) the discard was requested by node 5 (because of the value of the bus-node-identifier 552);
c) the reason to discard is number 7 (because of the value of the bus-error-identifier 553);

SECOND EXAMPLE—FIG. 6

Figure 6:
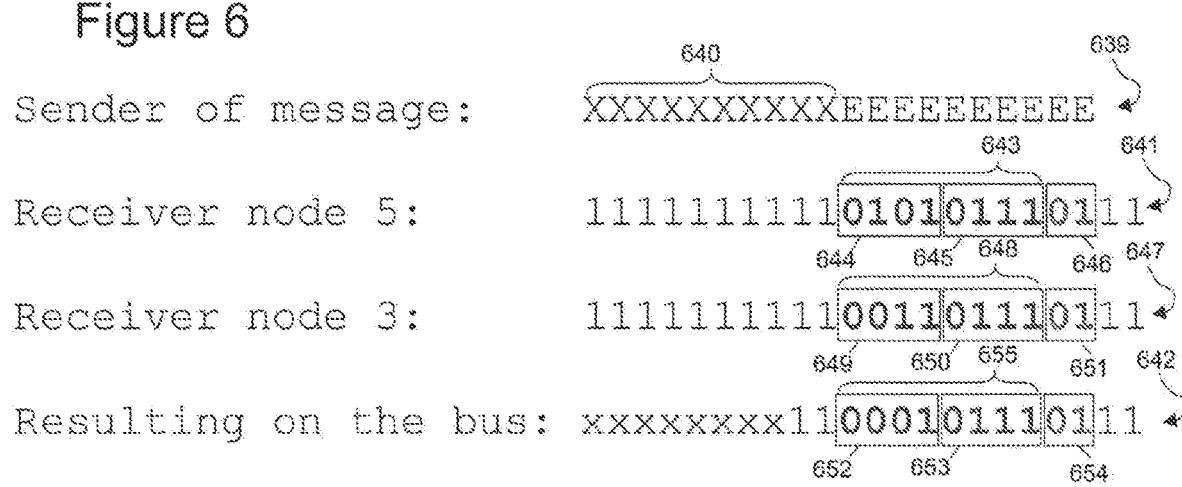

FIG. 6 shows data 639 that a node sends on to a serial communications bus. In the same way as FIG. 5, the data 639 includes a message 640.

FIG. 6 also shows data 641 that is put on to the serial communications bus by node 5. Node 5 outputs an error-signal 643 to the serial communications bus, in the same way as for FIG. 5. That is, Node 5 has again determined that condition number 7 has been violated. The error signal includes a node-identifier 644 and an error-identifier 645.

FIG. 6 also shows data 647 that is put on to the serial communications bus by node 3, which is again a different node to the one that sent the message 640. Node 3 has a security module that has compared the received message 640 with one or more conditions and has also detected that condition number 7 has been violated. Node 3 therefore outputs an error-signal 648 to the serial communications bus. The error-signal 648 includes a node-identifier 649 that identifies node 3 as the node that detected the condition, and also includes an error-identifier 650 that is associated with condition number 7.

FIG. 6 shows the resultant data 642 on the serial communications bus. In this example it is a combination of the message 640, the error-signal 643 provided by node 5, and the error-signal 648 provided by node 3. It is recalled that 0 is dominant over 1 in the protocol of this example, and therefore for bit positions in the two error-signals where nodes 3 and 5 provide different bit values, the dominant value of 0 will appear on the bus.

In this example, the second and third positions of the node-identifier 644 of node 5 and the node-identifier 649 of node 3 are different. When these node-identifiers are combined on the bus, it results in a bus-node-identifier 652 of 0001, which is a binary representation of decimal 1. Therefore, the bus-node-identifier 652 does not correctly reflect which nodes have detected the error.

In this example, both node 3 and node 5 have detected the same error. Therefore, the error-identifier 645 that was provided by node 5 is the same as the error-identifier 653 that was provided by node 3. When these error-identifiers are combined on the bus, it results in a bus-error-identifier 653 which correctly reflects the condition that has been violated.

The bus-node-identifier 652 and the bus-error-identifier 653 can together be referred to as a bus error-signal 655.

Node 5 also provides an error-check-signal 646 to the bus. Similarly, node 3 provides an error-check-signal 651 to the bus. As will now be discussed, security modules associated with each of the node sets their error-check-signals 646, 651 to indicate whether or not the bus-error-signal 655 on the bus correctly reflects the locally generated error-signal 643, 648.

The security module associated with node 5 can compare (i) the error-signal 643 that it outputs to the bus via its TXD output interface; with (ii) the bus-error-signal 655 that it receives via its RXD input interface. The security module can then output the error-check-signal 646 to the bus via the TXD output interface. The error-check-signal 646 is indicative of whether or not there is a difference between the locally generated error-signal 643 and the bus-error-signal 655. In this example, an error-check-signal 646 comprises one or more dominant bits if there is a difference between the error-signal 643 and the bus-error-signal 655.

The error-signals 643, 648 in FIG. 6 identify both a first parameter and a second parameter relating to the condition. The first parameter is an identifier of the node that detected the violation of the error, and is represented by the node-identifiers 644, 649. The second parameter is an identifier of the condition that has been violated, and is represented by the error-identifiers 645, 650. Similarly, the resulting bus-error-signal 655 includes the bus-node-identifier 652 and the bus-error-identifier 653.

The security module associated with node 5 can compare the locally generated node-identifier 644 with the bus-node-identifier 652, and can also separately compare the locally generated error-identifier 645 with the bus-error-identifier 653. As will be discussed below, the security module can provide the results of these separate comparisons in the error-check-signal 646 such that they are discernible from each other—for example by including the information at predetermined bit positions. The other nodes in the network can then correctly interpret the information at these bit positions because they are also programmed in accordance with the predetermined bit positions.

More generally, the error-check-signal 646 can comprise a first-error-check-signal, which is indicative of whether or not there is a difference between a first-identifier of the error-signal and a bus-first-identifier of the bus-error-signal. In this example, the first-identifier of the error-signal is a node-identifier, the bus-first-identifier is the bus-node-identifier, and the first-error-check-signal is implemented as the first bit-position of the error-check-signal 646. Similarly, the error-check-signal 646 can comprise a second-error-check-signal, which is indicative of whether or not there is a difference between a second-identifier of the error-signal and a bus-second-identifier of the bus-error-signal. In this example, the second-identifier of the error-signal is an error-identifier, the bus-second-identifier is the bus-error-identifier, and the second-error-check-signal is implemented as the second bit-position of the error-check-signal 646.

In the example of FIG. 6, node 5 determines that there is a difference between its locally generated node-identifier 644 and the bus-node-identifier 652, and therefore sets the first bit value of the error-check-signal 646 as a dominant 0. Node 5 also determines that its locally generated error-identifier 645 is the same as the bus-error-identifier 653, and therefore sets the second bit value of the error-check-signal 646 as a recessive 1.

Node 3 determines that there is a difference between its locally generated node-identifier 649 and the bus-node-identifier 652, and therefore sets the first bit value of the error-check-signal 651 as a dominant 0. Node 3 also determines that its locally generated error-identifier 650 is the same as the bus-error-identifier 653, and therefore sets the second bit value of the error-check-signal 651 as a recessive 1.

When the two error-check-signals 646, 651 are combined on the bus, the result is a bus-error-check-signal 654 which indicates that: the bus-node-identifier 652 does not accurately reflect which node detected the violation of the condition; and (ii) the bus-error-identifier 653 does accurately reflect the identity of the condition that has been violated.

By accessing, the data 642 on the serial communications bus, all nodes can determine that:
a) the message must be discarded, because there are dominant bits in the EOF;
b) the discard was requested by unknown nodes (even though the bus-node-identifier 652 suggests that node 1 detected the violation of the condition, the fact that the first bit of the bus-error-check-signal 654 is a dominant 0 will cause the nodes to ignore the bus-node-identifier 652);
c) the reason to discard is number 7 (because of the value of bus-error-identifier 653, and because the second bit of the error-check-signal is a recessive 1); and
d) part of the information in the bus-error-signal 655 was changed (because the error-check-signal includes a dominant 0).

THIRD EXAMPLE—FIG. 7

Figure 7:
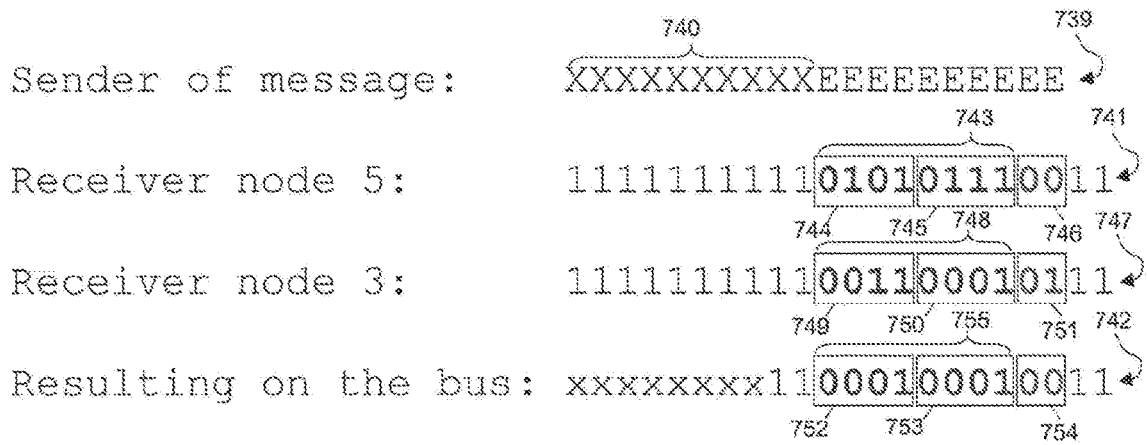
FIG. 7 illustrates a third example of data that can be put onto a serial communications bus according to an embodiment of the disclosure.

FIG. 7 shows data 739 that a node sends on to a serial communications bus. In the same way as FIG. 6, the data 739 includes a message 740.

FIG. 7 also shows data 741 that is put on to the serial communications bus by node 5. Node 5 outputs the same error-signal 743 as that shown for FIG. 6.

FIG. 7 also shows data 747 that is put on to the serial communications bus by node 3. Node 3 outputs an error-signal 748 to the serial communications bus. The error-signal 748 includes the same node-identifier 749 as shown in FIG. 6, but a different error-identifier 750. In this example, the error-identifier 750 is associated with condition number 1.

FIG. 7 shows the resultant data 742 on the serial communications bus. In this example, the second and third positions of the error-identifier 745 of node 5 and the error-identifier 750 of node 3 are different. When these error-identifiers 745, 750 are combined on the bus, it results in a bus-error-identifier 753 of 0001, which is a binary representation of decimal 1. Therefore, the bus-error-identifier 753 does not correctly reflect the conditions that have been violated.

In the same way as described with reference to FIG. 6, the bus-node-identifier 752 also does not correctly reflect which nodes have detected the error.

Node 5 provides an error-check-signal 746 to the bus. This error-check-signal 746 includes a first-error-check-signal (at the first bit position), which indicates that there is a difference between its locally generated node-identifier 744 and the bus-node-identifier 752. The error-check-signal 746 also includes a second-error-check-signal (at the second bit position), which indicates that there is a difference between its locally generated error-identifier 745 and the bus-error-identifier 753.

Node 3 also provides an error-check-signal 761 to the bus. This error-check-signal 751 includes a first-error-check-signal (at the first bit position), which indicates that there is a difference between its locally generated node-identifier 749 and the bus-node-identifier 752. The error-check-signal 751 also includes a second-error-check-signal (at the second bit position), which indicates that its locally generated error-identifier 750 is the same as the bus-error-identifier 753.

When the two error-check-signals 746, 751 are combined on the bus, the result is a bus-error-check-signal 754 which indicates that: the bus-node-identifier 752 does not accurately reflect which node detected the violation of the condition; and (ii) the bus-error-identifier 753 does not accurately reflect the identity of the condition that has been violated.

By accessing the data 742 on the serial communications bus, all nodes can determine that:
a) the message must be discarded, because there are dominant bits in the EOF;
b) the discard was requested by unknown nodes (because the first bit of the bus-error-check-signal 754 is a dominant 0);
c) the reason to discard is unknown (because the second bit of the bus-error-check-signal 754 is a dominant 0); and
d) part of the information in the bus-error-signal 755 was changed (because the error-check-signal includes a dominant 0).

FOURTH EXAMPLE—FIG. 8

FIG. 6 shows data 839 that a node sends on to a serial communications bus. In the same way as earlier figures, the data 839 includes a message 840.

Figure 8:
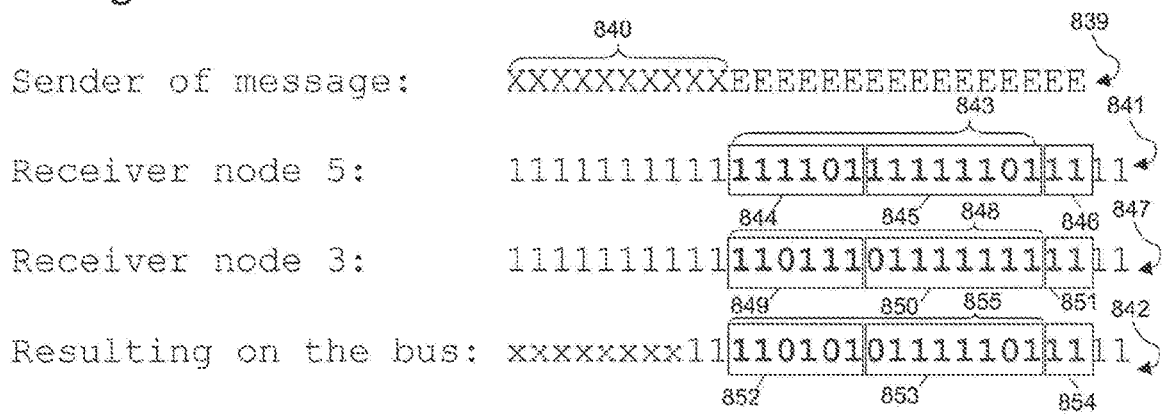
FIG. 8 illustrates a second example of data that can be put onto a serial communications bus according to an embodiment of the disclosure.

FIG. 8 also shows data 841 that is put on to the serial communications bus by node 5, and also data 847 that is put on to the serial communications bus by node 3. In this example, nodes 3 and 5 put error-signals 843, 848 on to the bus in a different format to that described above. As will be discussed below, the error-signals 843, 848 comprise a plurality of bit positions, and each of the bit positions uniquely identifies a particular condition or a particular node-identifier. In this example, there are six nodes in communication with the bus and eight different conditions that can be detected.

Node 5's error-signal 843 includes a node-identifier 844. The node-identifier 844 has six bit positions, which each uniquely identify a particular node. The security module associated with any one node can only set one of the bit positions of the node-identifier 844 to a dominant 0. For instance, a security module associated with a first node can set a first bit position of the node-identifier 844 to a dominant 0 if it detects that a condition has been violated, but it cannot set any of the other bit positions of the of the node-identifier 844. A security module associated with a second node can set a second bit position of the node-identifier 844 to a dominant 0 if it detects that a condition has been violated, but it cannot set any of the other bit positions of the of the node-identifier 844. Et cetera.

As shown in FIG. 8, the fifth bit position of the node-identifier 844 has been set to a dominant 0 to indicate that node 5 has detected the error.

Node 5's error-signal 843 also includes an error-identifier 845. The error-identifier 845 has eight bit positions, which each uniquely identify a particular condition that can be detected. A security module can set one or more of the bit positions of the error-identifier 845 to a dominant 0 if it detects the violation of an associated condition. For instance, if a security module detects violation of a first condition then it sets the first bit position of the error-identifier 845 to a dominant 0. If a security module detects violation of a second condition then it sets the second bit position of the error-identifier 845 to a dominant 0. Et cetera.

As shown in FIG. 8, the seventh bit position of the error-identifier 845 has been set to a dominant 0 to indicate that condition 7 has been violated.

Node 3's error-signal 848 also includes a node-identifier 840 and an error-identifier 850. As shown in FIG. 8, the third bit position of the node-identifier 849 has been set to a dominant 0 to indicate that node 3 has detected the error. The first bit position of the error-identifier 850 has been set to a dominant 0 to indicate that condition 1 has been violated.

FIG. 8 shows the resultant data 842 on the serial communications bus. In this example when the error-signal 843 provided by node 5 is combined with the error-signal 848 provided by node 3, the resultant bus-error-signal 855 retains identifiers of which nodes detected errors and which errors were detected.

One or more of the nodes can store a correlation between the bit position in a node-identifier and an identifier of the associated node. In some examples, this can enable a node to take remedial action that is specific to the node that detected the error. One or more of the nodes can also store a correlation between the bit position in an error-identifier 845 and an identifier of an associated condition. In some examples, this can enable a node to take remedial action that is specific to the errors that have been detected. Examples of remedial action that can be taken are described in more detail below.

In this example, the error-check-signals 846, 851 are used differently to their use in the earlier examples. This is because the bit positions of the error-signals 843, 848 uniquely identify a particular error condition or a particular node-identifier. Therefore, in determining whether to set the error-check-signals 846, 851 as 1 or 0, a node can compare (i) the value of a particular bit position of the error-signal 843, 848 that it outputs to the bus via its TXD output interface; with (ii) the value of the same bit position of the bus-error-signal 855 that it receives via its RXD input interface.

In relation to the node-identifier 844 of node 5's error-signal 843, the $5^{th}$ bit position of the node-identifier 844 is uniquely associated with node 5. Therefore, no other node should be able to set the $5^{th}$ bit position of the bus-node-identifier 852 of the error-signal 855 on the bus. In order to determine whether or not to set the first bit of the error-check-signal 846, node 5 compares (i) the value of the $5^{th}$ bit position of the node-identifier 844; with (ii) the value of the $5^{th}$ bit position of the bus-node-identifier 852. As shown in FIG. 8, the $5^{th}$ bit position of both the node-identifier 844 and the bus-node-identifier 852 is a 0. Therefore, the node determines that the value that it has put onto the bus for its unique bit position in the node-identifier 844 is accurately reflected in the bus-node-identifier 852, and it sets the first bit of the error-check-signal 846 as 1. If the node determined that the value that it had put onto the bus for its unique bit position in the node-identifier 844 was not accurately reflected in the bus-node-identifier 852, then it would set the first bit of the error-check-signal 846 as a dominant 0.

Similarly, node 3 determines that the value of the $3^{rd}$ bit of its node-identifier 849 correctly matches the value of the $3^{rd}$ bit of the bus-node-identifier 852 and therefore also sets the first bit of its error-check-signal 851 as 1.

If any node detects a dominant 0 in the first bit position of the bus-error-check-signal 854, then the nodes can take any of the actions described elsewhere in this document in relation to the detection of a dominant 0 in an error-check-signal.

Optionally, the second bit position of the error-check-signals 846, 851, 854 can be used when each bit position of the error-identifiers 845, 850 is uniquely associated with an error condition that only a single node can detect. In which case, the nodes can set the value of the second bit positions of the error-check-signals 846, 851 in a similar way as the first bit positions as described above, by comparing the value of a particular bit position of an error-identifier; with (ii) the value of the same bit position of the bus-error-identifier.

In other examples, the error-check-signals 846, 851, 854 may not be required because it is still possible to discern the identifiers of which nodes detected errors and which errors were detected from the bus-error-signal 855.

By accessing the data 842 on the serial communications bus, all nodes can determine that:
a) a) the message must be discarded, because there are dominant bits in the EOF;
b) the discard was requested by nodes 3 and 5 (the dominant bits in the bus-node-identifier 852 indicate nodes 3 and 5); and
c) the reasons to discard are 1 and 7 (the dominant bits in the bus-error-identifier 853 indicate nodes 3 and 5),
d) information that was put onto the bus by the nodes has not been lost, nor has any node been incorrectly identified as putting an error-signal onto the bus when it didn't, thus no modification is flagged as the relevant dominant bits in the bus-error-signal 855 are preserved (the 2 bits of the bus-error-signal are recessive 1).

Optionally, a bus-error-check-signal 854 can be used to indicate whether or not a modification has been made to an error-signal that has been sent by a security module, which can be used as a flag that indicates that more than one node is sending an error-signal.

FIFTH EXAMPLE—FIG. 9

Figure 9:
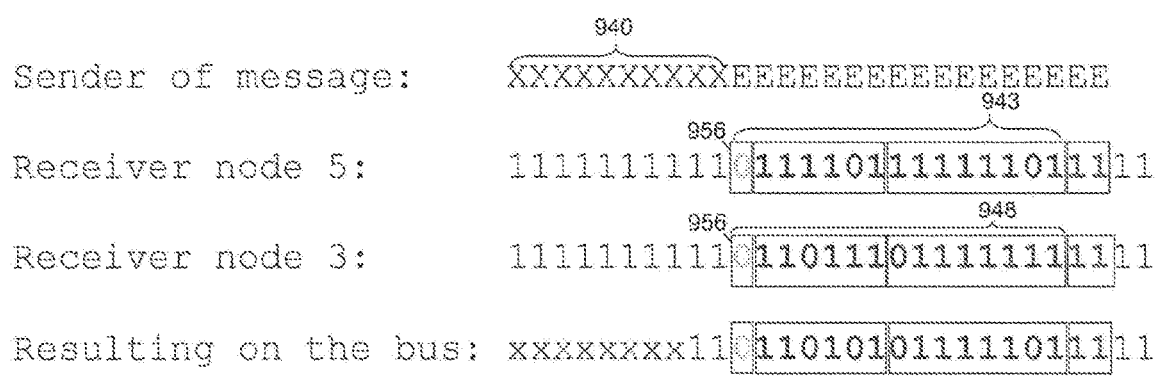
FIG. 9 illustrates a fifth example of data that can be put onto a serial communications bus according to an embodiment of the disclosure.

FIG. 9 is an example that is very similar to FIG. 8. The only difference between the two examples is that in FIG. 9 the error-signals 943, 948 that are transmitted onto the bus include a dominant bit value at a predetermined bit position 956. In FIG. 9, the predetermined bit position 956 is the first bit position, and can be considered as representing an error-flag.

The error-flag does not identify the node that detected the error, nor does it indicate the condition that has been violated. Instead, the error-flag can be considered as putting the nodes in the network on notice that an error has been detected and that further information about one or more parameters relating to the condition will follow.

Use of such an error-flag can be advantageous where the number of bits in an error-signal is high, and thus in a worst case scenario the first dominant bit in the error-signal could occur later than the end of the EOF field. By which time the nodes in the network may have assumed that no error has been detected and therefore they may have processed the message 940. The error-flag can be included at any predetermined bit position 956 that is before the end of the EOF field for a particular protocol. The error-flag is only set to a dominant value by a node if there will be subsequent dominant bits in the error-signal.

A further advantage of the error-flag is that it can help to ensure better synchronicity of senders and receivers on the bus.

For any of the examples disclosed herein, upon the detection of an error, the security module or an associated controller may perform one or more of the following remedial actions:
1. if the security module is associated with the node that sent the message that caused the error, then the node might need to be reset/re-boot to avoid further violation.
2. logging that an error has been detected, and optionally storing one or more parameters relating to the condition such as node-identifiers/error-identifiers. The logged information may be accessed by the node or a network operator for future analysis.
3. alerting or displaying an error to a network operator that an error has been detected. The network operator may take appropriate further action such as shutting down the network, enabling a safety mode of one or more nodes in the network.
4. The security module that detected the error, or an associated local controller, may put its node into an emergency mode or safe mode. This may include disabling, limiting or denying access to certain features.
5. The local controller may automatically send a message to one or more other nodes or the network. The message may alert the nodes or network to the detected error and/or put one or more nodes into an emergency mode As indicated above, in some examples the remedial action that is taken can be automatically selected by a processor or module based on a bus-node-identifier and/or a bus-error-identifier (or more generally a bus-error-signal).

Examples described herein can add a signalling at the end of a serial data frame that is used to force all receivers to discard the message, whereby the sender of such discard signal may be different from the sender of the serial data frame. The sender of the discard signal can encode the reason why the message is to be discarded into the discard signal and can flag modifications of the discard signal by e.g. rogue nodes.

Figure 10:
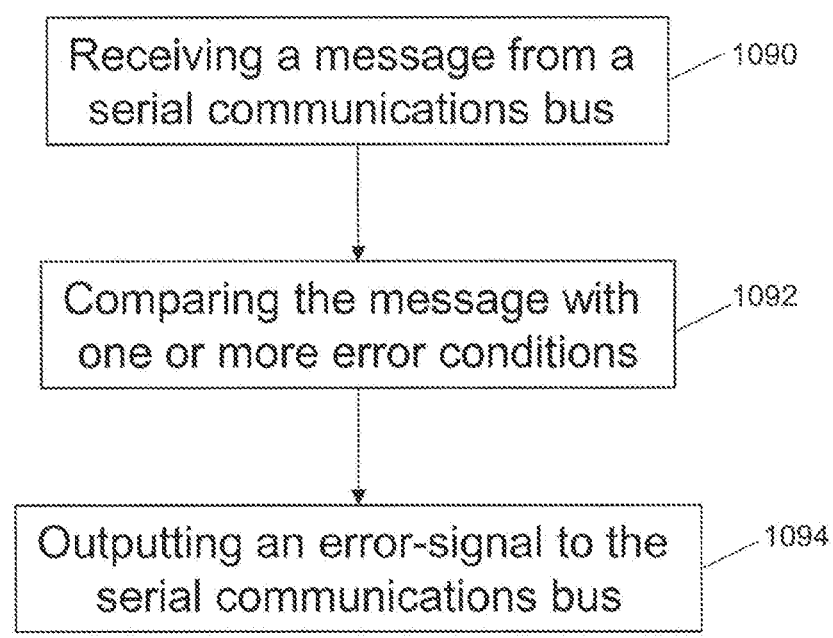
FIG. 10 illustrates an example method according to an embodiment of the disclosure.

FIG. 10 illustrates an example embodiment of a method of outputting an error-signal to a serial communications bus. As discussed above, the serial communications bus may or may not be a CAN XL bus.

At step 1090, the method comprises receiving a message from the serial communications bus (404). The message can be sent by any node on the bus. The method can involve determining whether or not the received message was sent from the local host or not. If the message was sent by the local host/node, then it may apply different or additional conditions than would be the case if the message had been received by a remote host/node. For instance, one or more policies may only be checked to see if they have been violated for a remotely received message that has the identifier of the local host/node.

At step 1092, the method includes comparing the message with one or more conditions. As described above, such conditions can relate to stuff errors, form errors, intrusion errors, scheduling errors, policy violations, or any other types of error/policies that are known in the art.

Upon detection that a condition has been violated, at step 1094 the method comprises outputting an error-signal to the serial communications bus. As described throughout this document, the error-signal identifies one or more parameters relating to the condition, which can include an identifier of a node that has detected the error and/or an identifier of the condition that has been violated.

One or more of the examples disclosed herein can provide a mechanism to invalidate a frame/message by a cyber or safety function, where one does not already exist, such as in CAN XL. Also, examples described herein can provide a mechanism for identifying which node detected an error and/or for what reason the message shall be discarded to receivers and transmitters on a serial communications network.

In certain applications, one or more of the following features/results can be provided/achieved:
1. A CAN XL node can discard a CAN XL message, when defined bits in the end-of-frame field (EOF) are received dominant.
2. A node receiving dominant bits in the EOF after a CAN XL frame may not send a reactive error flag, as it would do after a Classical or CAN FD message.
3. The discard signal can comprise a certain number of bits in which information e.g. sender ID, sending reason are encoded. The start of the discard signal can be at a defined bit position in the EOF.
4. A node sending the discard signal can append several bits that shall be sent recessive when the information encoded are read back unchanged. In case the information read back differs from what is sent one or more of the appended bits can be send dominant. This is to flag modifications that may be caused by rogue nodes, or an overlay of different nodes sending a discard signal.
5. All nodes can read the bits in the EOF and provide those to higher protocol layers.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers, or other control or computing devices. A processor can refer to a single component or to plural components.

In other examples the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

What is claimed is:

1. A security module for a serial communications device, the security module comprising:
   a receive data, RXD, input interface for receiving data from a serial communications bus;
   a transmit data, TXD, output interface for transmitting data to the serial communications bus;
   wherein the security module is configured to:
      receive a message from the serial communications bus via the RXD input interface;
      compare the message with one or more conditions;
      upon detection that a condition has been violated, output an error-signal to the serial communications bus via the TXD output interface, wherein the error-signal identifies one or more parameters relating to the condition;

compare (i) the error-signal that is output to the serial communications bus via the TXD output interface; with (ii) a bus-error-signal that is received via the RXD input interface; and output an error-check-signal to the serial communications bus via the TXD output interface, wherein the error-check-signal is indicative of whether or not there is a difference between the error-signal and the bus-error-signal;

wherein the error-signal comprises: a first-identifier relating to the condition; and a second-identifier relating to the condition;

wherein the bus-error-signal comprises: a bus-first-identifier relating to the condition; and a bus-second-identifier relating to the condition; and wherein the error-check-signal comprises:
  a first-error-check-signal, which is indicative of whether or not there is a difference between: (i) the first-identifier of the error-signal; and (ii) the bus-first-identifier of the bus-error-signal; and
  a second-error-check-signal, which is indicative of whether or not there is a difference between: (i) the second-identifier of the error-signal; and (ii) the bus-second-identifier of the bus-error-signal.

2. The security module of claim 1, wherein the one or more parameters relating to the condition can take one of at least three different values.

3. The security module of claim 1, wherein the error-signal comprises an error-identifier of one or more conditions that have been violated.

4. The security module of claim 1, wherein the security module is associated with a serial communications node, and the error-signal comprises a node-identifier of the serial communications node.

5. The security module of claim 1, wherein the error-signal comprises a security-module-identifier of the security module.

6. The security module of claim 1, wherein the error-check-signal comprises one or more dominant bits if there is a difference between the error-signal and the bus-error-signal.

7. The security module of claim 1, wherein:
the security module is associated with a serial communications node;
the first-identifier comprises a node-identifier of the serial communications node;
the bus-first-identifier comprises a bus-node-identifier of one or more serial communications nodes;
the second-identifier comprises an error-identifier of one or more conditions that have been violated; and
the bus-second-identifier comprises a bus-error-identifier of one or more conditions that have been violated.

8. The security module of claim 1, wherein the error-signal comprises a plurality of bit positions, and wherein each of the bit positions uniquely identifies a particular condition or a particular node-identifier.

9. The security module of claim 8, wherein:
the security module is associated with a serial communications node;
the error-signal comprises a node-identifier of the serial communications node;
the node-identifier comprises a plurality of bit positions;
each of the bit positions of the node-identifier uniquely identifies a particular node;
the error-signal comprises an error-identifier of one or more s that have been violated;
the error-identifier comprises a plurality of bit positions;

each of the bit positions of the error-identifier uniquely identifies a particular condition.

10. The security module of claim 1, wherein the error-signal comprises a plurality of bit positions, and wherein the error-signal comprises a dominant bit value at a predetermined bit position.

11. The security module of claim 10, wherein the predetermined bit position is the first bit position.

12. The security module of claim 1, wherein:
the serial communications device in a CAN XL node; and
the serial communications bus is a CAN XL bus.

13. A serial communications node comprising a security module, the security module comprising:
a receive data, RXD, input interface for receiving data from a serial communications bus;
a transmit data, TXD, output interface for transmitting data to the serial communications bus;
wherein the security module is configured to:
  receive a message from the serial communications bus via the RXD input interface;
  compare the message with one or more conditions;
  upon detection that a condition has been violated, output an error-signal to the serial communications bus via the TXD output interface, wherein the error-signal identifies one or more parameters relating to the condition and wherein the error-signal comprises:
an error-identifier of one or more conditions that have been violated; and
a node-identifier of the serial communications node;
  compare (i) the error-signal that is output to the serial communications bus via the TXD output interface; with (ii) a bus-error-signal that is received via the RXD input interface; and
  output an error-check-signal to the serial communications bus via the TXD output interface, wherein the error-check-signal is indicative of whether or not there is a difference between the error-signal and the bus-error-signal;
wherein the error-signal comprises: the node-identifier of the serial communications node;
and the error-identifier of the one or more conditions that have been violated;
wherein the bus-error-signal comprises: a bus-node-identifier of one or more serial communications nodes; and a bus-error-identifier of one or more conditions that have been violated; and
wherein the error-check-signal comprises:
  a first-error-check-signal, which is indicative of whether or not there is a difference between: (i) the node-identifier of the error-signal; and (ii) the bus-node-identifier of the bus-error-signal; and
  a second-error-check-signal, which is indicative of whether or not there is a difference between: (i) the error-identifier of the error-signal; and (ii) the bus-error-identifier of the bus-error-signal.

14. A method of outputting an error-signal to a serial communications bus, the method comprising:
receiving a message from the serial communications bus;
comparing the message with one or more conditions;
upon detection that a condition has been violated, outputting an error-signal to the serial communications bus, wherein the error-signal identifies one or more parameters relating to the condition;
comparing (i) the error-signal that is output to the serial communications bus; with (ii) a bus-error-signal that is received; and outputting an error-check-signal to the serial communications bus, wherein the error-check-signal is indicative of whether or not there is a difference between the error-signal and the bus-error-signal;

wherein the error-signal comprises: a first-identifier relating to the condition; and a second-identifier relating to the condition;

wherein the bus-error-signal comprises: a bus-first-identifier relating to the condition; and a bus-second-identifier relating to the condition; and wherein the error-check-signal comprises:
- a first-error-check-signal, which is indicative of whether or not there is a difference between: (i) the first-identifier of the error-signal; and (ii) the bus-first-identifier of the bus-error-signal; and
- a second-error-check-signal, which is indicative of whether or not there is a difference between: (i) the second-identifier of the error-signal; and (ii) the bus-second-identifier of the bus-error-signal.

15. The method of claim 14, wherein the error-signal comprises an error-identifier of one or more conditions that have been violated.

16. The method of claim 14, wherein the error-signal comprises a node-identifier of a serial communications node.

17. A security module for a serial communications device, the security module comprising:
- a receive data, RXD, input interface for receiving data from a serial communications bus;
- a transmit data, TXD, output interface for transmitting data to the serial communications bus;

wherein the security module is configured to:
- receive a message from the serial communications bus via the RXD input interface;
- compare the message with one or more conditions;
- upon detection that a condition has been violated, output an error-signal to the serial communications bus via the TXD output interface, wherein the error-signal identifies one or more parameters relating to the condition, wherein the error-signal comprises a plurality of bit positions, and wherein each of the bit positions uniquely identifies a particular condition or a particular node-identifiers;

wherein:
the security module is associated with a serial communications node;
the error-signal comprises a node-identifier of the serial communications node;
the node-identifier comprises a plurality of bit positions;
each of the bit positions of the node-identifier uniquely identifies a particular node;
the error-signal comprises an error-identifier of one or more s that have been violated;
the error-identifier comprises a plurality of bit positions; and
each of the bit positions of the error-identifier uniquely identifies a particular condition.

18. The security module of claim 17, wherein the one or more parameters relating to the condition can take one of at least three different values.

19. The security module of claim 17, wherein the error-signal comprises an error-identifier of one or more conditions that have been violated.

20. The security module of claim 17, wherein the security module is associated with a serial communications node, and the error-signal comprises a node-identifier of the serial communications node.

* * * * *